(12) United States Patent
Ikarashi

(10) Patent No.: US 6,338,561 B1
(45) Date of Patent: Jan. 15, 2002

(54) LUMINOUS POINTER

(75) Inventor: Hideki Ikarashi, Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/380,964

(22) PCT Filed: Jan. 27, 1999

(86) PCT No.: PCT/JP99/00351

§ 371 Date: Sep. 14, 1999

§ 102(e) Date: Sep. 14, 1999

(87) PCT Pub. No.: WO99/39162

PCT Pub. Date: Aug. 5, 1999

(30) Foreign Application Priority Data

Jan. 29, 1998 (JP) ............................................ 10-016804

(51) Int. Cl.⁷ .............................................. G01D 11/28
(52) U.S. Cl. ............................ 362/26; 362/23; 362/29; 362/30; 362/84; 116/48; 116/288
(58) Field of Search ............................. 362/23, 26, 29, 362/30, 84; 116/48, 288, DIG. 36

(56) References Cited

U.S. PATENT DOCUMENTS

| | | | | |
|---|---|---|---|---|
| 5,911,492 A | * | 6/1999 | Perry et al. ................... | 362/26 |
| 5,983,827 A | * | 11/1999 | Cookingham et al. ....... | 116/288 |
| 6,082,288 A | * | 7/2000 | Kato et al. ................... | 116/286 |
| 6,161,934 A | * | 12/2000 | Griffin et al. ................. | 362/26 |

FOREIGN PATENT DOCUMENTS

| | | | |
|---|---|---|---|
| EP | 0 610 105 | 8/1994 | ........... 362/26 |
| FR | 2 687 470 | 8/1993 | ........... 362/26 |
| FR | 2 721 396 | 12/1995 | ........... 362/26 |
| JP | 1-124596 | 8/1989 | ........... 362/26 |
| JP | 2-26019 | 7/1990 | ........... 362/26 |
| JP | 5-90324 | 12/1993 | ........... 362/26 |
| JP | 6-12995 | 2/1994 | ........... 362/26 |
| JP | 8-10777 | 3/1996 | ........... 362/26 |
| JP | 9-96550 | 4/1997 | ........... 362/26 |
| JP | 9-96551 | 4/1997 | ........... 362/26 |
| JP | 09/096550 | 4/1997 | ........... 362/26 |

* cited by examiner

*Primary Examiner*—Stephen Husar
*Assistant Examiner*—Anabel Ton
(74) *Attorney, Agent, or Firm*—McDermott, Will & Emery

(57) ABSTRACT

The invention provides a luminous pointer which can offer an increased commercial value with its glowing surface having the ability to glow generally uniformly. The luminous pointer is constructed of a pointer element 1 which is made of a light-transmitting material and forms an indicating portion (glowing surface) 2, a light-blocking cover 10 which covers a central region of swing motion R of the pointer element 1 and opens rearward, and a shielding element 12 which covers the rear side of the central region of swing motion R of the pointer element 1. The pointer element 1 has in its central region of swing motion R reflecting parts 4 to 7 for reflecting illuminating light fed from the rear side at least toward its tip end, and the shielding element 12 has exposing parts 123 for exposing the reflecting parts 4 to 7 of the pointer element 1 and is formed of a light-transmitting material which makes it possible to adjust the amount of transmission of the illuminating light.

20 Claims, 4 Drawing Sheets

LUMINOUS POINTER

TECHNICAL FIELD OF THE INVENTION

The present invention relates to a luminous pointer applicable to various kinds of measuring instruments and the like. More particularly, the invention is concerned with an improvement of a luminous pointer which introduces light for illumination from a central part of its swing motion and glows in the form of a line.

BACKGROUND ART

A luminous pointer of this kind known in the prior art is constructed such that illuminating light is introduced from an external light source into a pointer element formed of a transparent material, causing it to glow in the form of a line.

More specifically, there is provided a reflecting part in a central region of swing motion of the pointer element formed of a transparent resin material, such as an acrylic resin or polycarbonate, for reflecting the illuminating light toward an extreme end of the pointer element and the central region of swing motion of the pointer element including the reflecting part is covered with a light-blocking cover in which a slit for exposing a glowing surf ace area is formed. In this construction, a glowing surface which illuminates in a continuous line-shaped pattern including the central region of swing motion covered with the light-blocking cover is obtained when the illuminating light introduced into the pointer element is delivered toward its extreme end by way of the reflecting part.

In this type of luminous pointer wherein the central region of swing motion covered with the light-blocking cover serves as part of the glowing surface and the aforementioned reflecting part is provided immediately beneath the pointer element as described above, a portion of the glowing surface located within the central region of swing motion which serves also as an illuminating light inlet area glows with relatively higher intensity. Under this circumstance, there have been proposed some arrangements to achieve uniform illumination of the glowing surface. One known arrangement is to form a cavity in the central region of swing motion and mount a filter element which alters the amount of transmission of the illuminating light within the cavity as disclosed in Japanese Utility Model Laid-Open No. 12995/1994, for example. Another arrangement is to dispose a light-blocking plate (shielding element) having a hole corresponding to the reflecting part in the back of the central region of swing motion to restrict the illuminating light introduced as disclosed in Japanese Utility Laid-Open No. 90324/1993.

Luminous pointers whose central region of swing motion serves as part of a glowing surface include such a type that has a reflecting part located to the side of the glowing surface of the pointer element as disclosed in Japanese Utility Laid-Open No. 124596/1989. In this type of luminous pointer, however, an area located in the central region of swing motion serving as the illuminating light inlet area tends to become relatively brighter as well. Thus, still another known arrangement is constructed such that the central region of swing motion of the pointer element including an area corresponding to the reflecting part is covered with a light-blocking element of the same type as the light-blocking plate disclosed in Japanese Utility Laid-Open No. 90324/1993 and a hole corresponding to the reflecting part is formed in the light-blocking element. This arrangement is intended to restrict an inlet path of the illuminating light in the central region of swing motion to an area corresponding to the hole to thereby to achieve uniform illumination.

The aforementioned arrangement in which the filter element is mounted as a means for achieving uniform illumination of the glowing surface, however, has a problem that a shadow of the filter element is created in an area of the glowing surface corresponding to the filter element because the location of the filter element is relatively close to the glowing surface, and this can impair the commercial value.

The arrangement in which the illuminating light to be introduced is restricted by use of the light-blocking plate has such a problem that an area of the glowing surface which is located in the central region of swing motion and covered by the light-blocking plate, for instance, could become dim and it is difficult to achieve uniform illumination of the glowing surface, because the inlet path of the illuminating light is restricted to the area corresponding to the reflecting part exposed through the hole due to the existence of the light-blocking plate. The lack of brightness of this kind in an area of the glowing surface located in the central region of swing motion is likely to occur especially in the arrangement in which the reflecting part located to the side of the glowing surface.

This invention has been made in the light of the foregoing problems. Accordingly, it is an object of the invention to provide a luminous pointer which can offer an increased commercial value by causing its glowing surface to glow generally uniformly.

DISCLOSURE OF THE INVENTION

A luminous pointer according to the invention is constructed of a pointer element which is made of a light-transmitting material and forms an indicating portion (glowing surface), a light-blocking cover which covers a central region of swing motion of the pointer element and opens rearward, and a shielding element which covers the rear side of the central region of swing motion of the pointer element. The pointer element has in its central region of swing motion reflecting parts for reflecting illuminating light fed from the rear side at least toward its tip end, and the shielding element is formed of a light-transmitting material and has an exposing part for exposing the reflecting parts of the pointer element. Since the illuminating light which has passed through the shielding element is introduced into the central region of swing motion of the pointer element in addition to the illuminating light that is introduced directly through the exposing part, the amount of entire illuminating light introduced into an area of the glowing surface located within the central region of swing motion is increased, making it possible to suppress unevenness in brightness of the glowing surface.

In other words, besides that portion of the illuminating light which is introduced directly through the exposing part made in the shielding element, and not passing through it, into the area of the glowing surface located within the central region of swing motion, another portion of the illuminating light of which amount has been adjusted by passing through the shielding element is also supplied. As a result, the amount of light delivered to that part of the glowing surface which is located within the central region of swing motion and covered by the shielding element is increased and this makes it possible to cause the glowing surface to glow generally uniformly.

BRIEF DESCRIPTION OF THE DRAWINGS

FIGS. 1 to 4 are diagrams showing a first embodiment of the invention, in which FIGS. 1(*a*) to 1(*c*) are a top view, a side view and a bottom view of a pointer element used in a luminous pointer according to the first embodiment, respectively;

FIG. 4 is a cross-sectional diagram showing an assembled state of the luminous pointer according to the embodiment.

BEST MODES FOR CARRYING OUT THE INVENTION

Figure 1A:
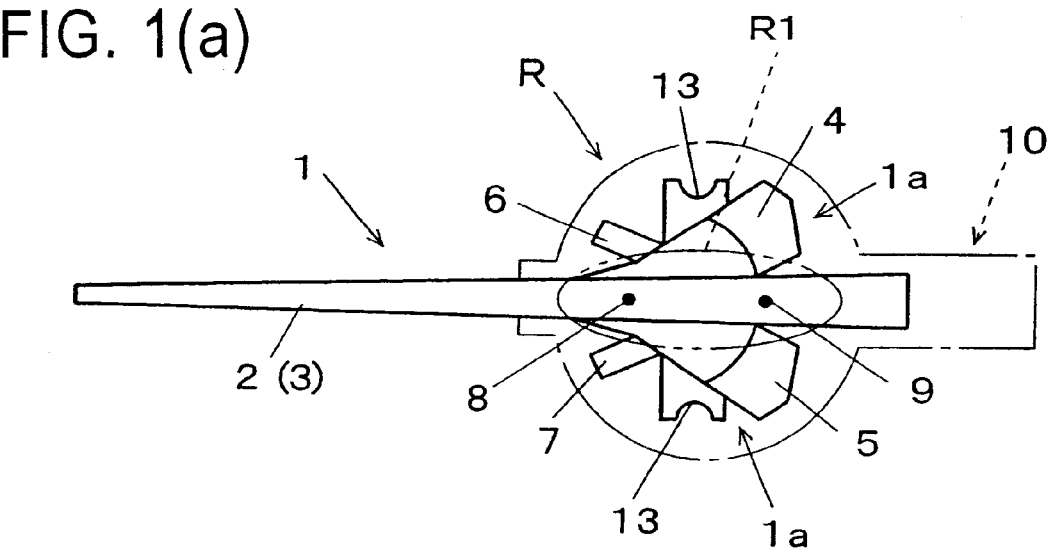
Figure 1B:
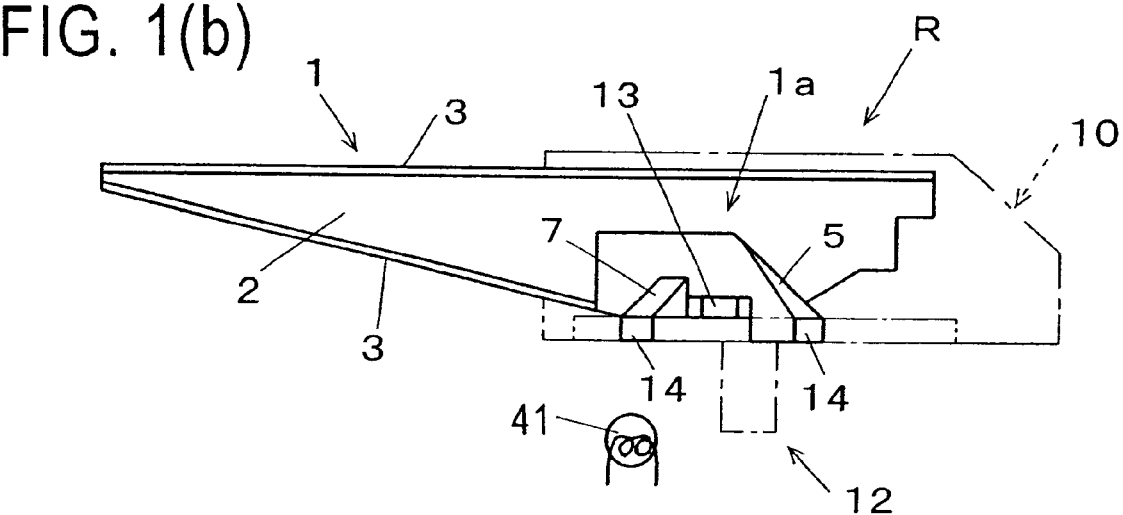
Figure 1C:
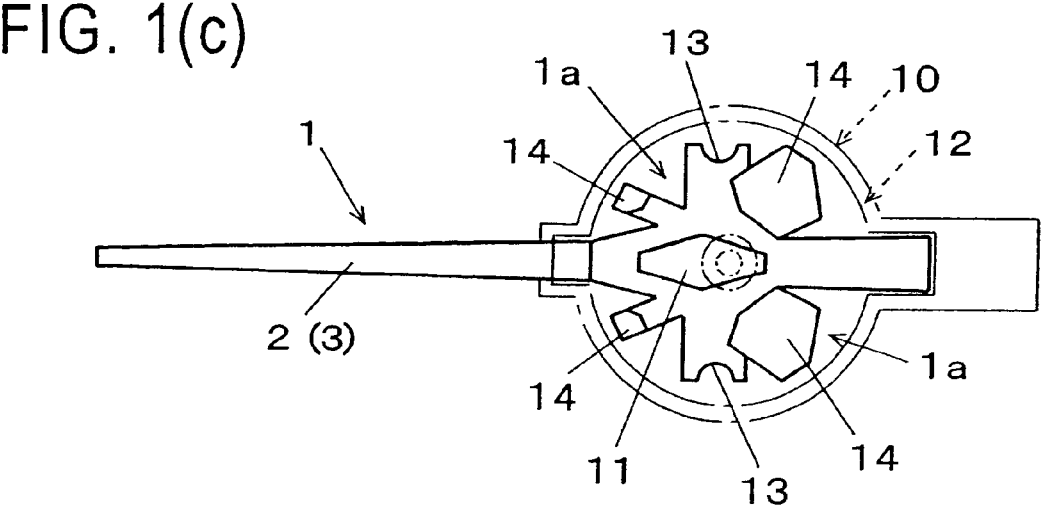

Referring to FIGS. 1(a) to 1(c), a pointer element 1 made of a light-transmitting resin material, such as acrylic or polycarbonate, extends in the form of a straight line and has on its front side a front surface of an indicating portion 2 constituting a later-described glowing surface and on its rear side a pigmented portion 3 formed of a hot-stamping layer.

In a central region of swing motion R which is connected to an unillustrated pointer shaft for driving the pointer element 1 (indicating portion 2) and covered with a later-described light-blocking cover, there are provided a plurality of reflecting parts 4 to 7 which cause the front surface of the indicating portion 2 to become a continuous glowing surface all the way from its tip end to rear illuminating light is fed from an external light source 41 from the extreme rear part of the indicating portion 2.

These reflecting parts 4 to 7 are formed in an area outside of the indicating portion 2 within the central region of swing motion R using wall surfaces of projecting parts la protruding to both sides of the indicating portion 2 with respect to a Longitudinal axial line of its front surface which serves as the glowing surface. The reflecting parts 4 to 7 have a light-concentrating portion 8 where beams of illuminating light individually reflected to the tip end side of the indicating portion 2 converge as well as a pair of reflecting parts (first reflecting parts) 4, 5 which supply the reflected light to the tip end side of the indicating portion 2 to cause it to glow. The reflecting parts 4 to 7 further have a light-concentrating portion 9 where beams of illuminating light individually reflected to the rear end side of the indicating portion 2 converge as well as a pair of reflecting parts (second reflecting parts) 6, 7 which supply the reflected light to the rear end side of the indicating portion 2 to cause it to glow. Of the central region of swing motion R including the reflecting parts 8, 9, frontal and surrounding areas excluding the indicating portion 2 are covered with the later-described light-blocking cover 10.

Further, a cavity 11 for preventing sink marks is formed in a central part of the rear side of the central region of swing motion R and the rear side of the central region of swing motion R including the cavity 11 is covered with a later-described shielding element 12. In FIGS. 1(a) to 1(c), the numeral 13 indicates a flange portion for positioning the pointer element relative to the light-blocking cover 10 and the numeral 14 indicates light-receiving projecting parts formed to protrude from the rear side of the central region of swing motion R corresponding to the individual reflecting parts 4 to 7.

Figure 2A:
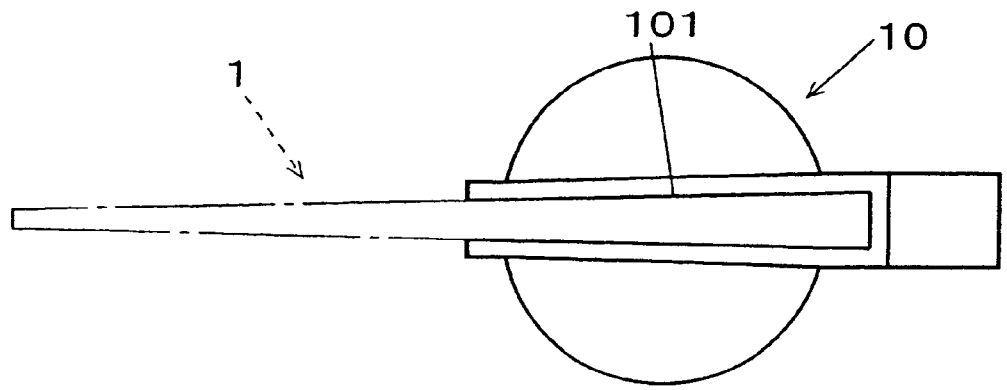
FIGS. 2(a) to 2(c) are a top view, a side view and a bottom view of a light-blocking cover mounted on the pointer element of FIG. 1, respectively.
Figure 2B:
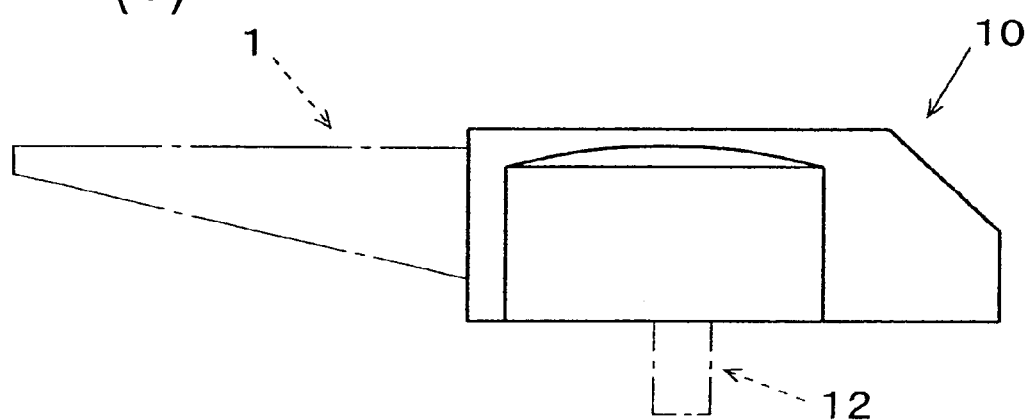
Figure 2C:
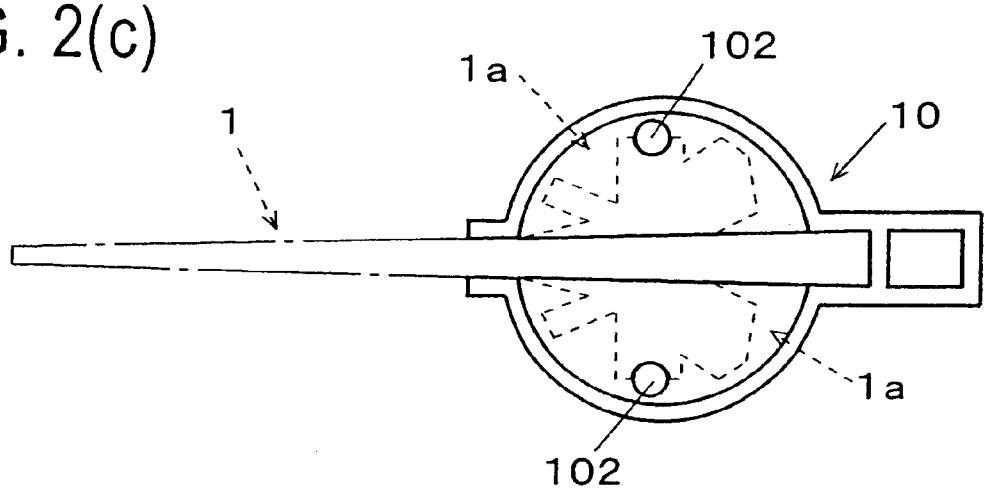

Referring to FIGS. 2(a) to 2(c), the light-blocking cover 10 is made by forming a black synthetic resin material into a cup-like shape with its rear side opening. The light-blocking cover 10 has a slit 101 which serves to expose an area of the indicating portion 2 (glowing surface) located within the central region of swing motion R of the indicating portion 2 so that the glowing surface which should illuminate in a continuous line-shaped pattern would not break up, as well as projections 102 which mesh with the flange portion 13 of the pointer element 1 to position the pointer element 1, wherein the light-blocking cover 10, the pointer element 1 and the shielding element 12 are joined together as extreme ends of the projections 102 pass through the shielding element 12 to its rear side and are welded thereto.

Figure 3A:
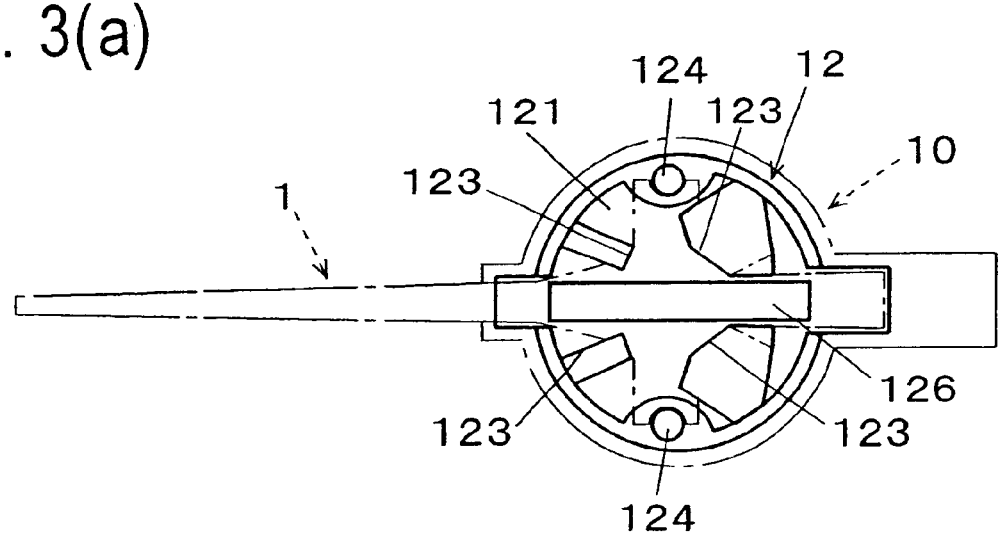
FIGS. 3(a) to 3(c) are a top view, a side view and a bottom view of a shielding element used for the pointer element of FIGS. 1 and 2, respectively.
Figure 3B:
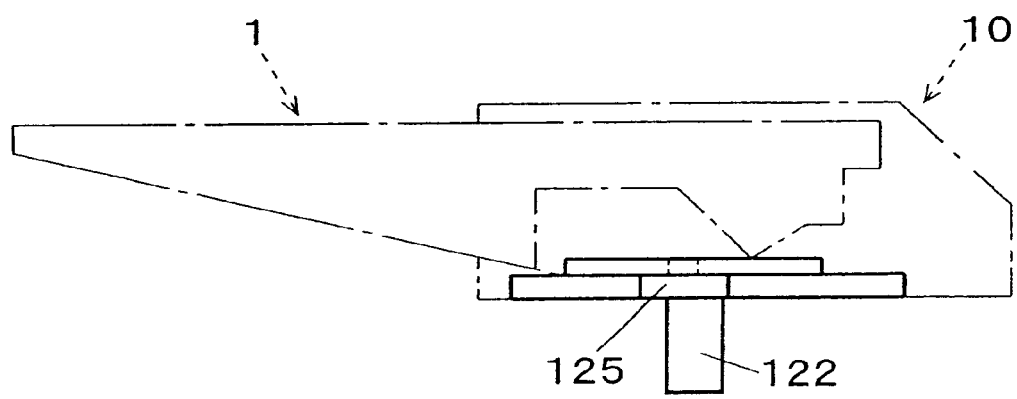
Figure 3C:
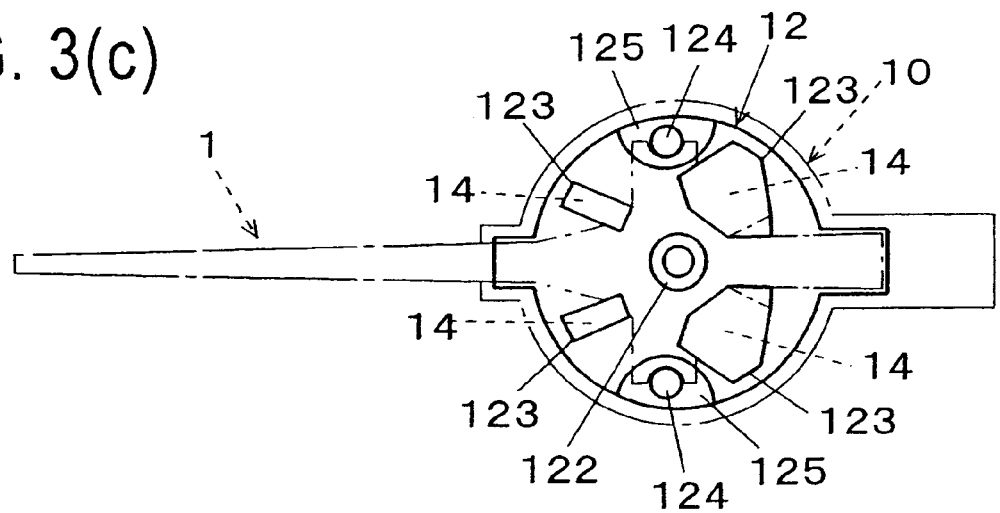

Referring to FIGS. 3(a) to 3(c), the shielding element 12, which is constructed of part of a joining member for firmly fixing the pointer element 1 to the unillustrated pointer shaft, includes a mounting portion 120 where the central region of swing motion R of the pointer element 1 is placed and fixed, the mounting portion 120 having exposing parts which take the form of through holes made at positions corresponding to the reflecting parts 4 to 7 of the pointer element 1 for exposing the reflecting parts 4 to 7, and a boss portion 121 which projects rearward from a central part of the rear side of the mounting portion 120 and is forcibly fitted and fixed to the later-described pointer shaft.

The shielding element 12 which works also as a connecting member is formed entirely of a light-transmitting material consisting essentially of a tinted transparent resin having a matte surface of a dark color. A restricting plate portion 121 has an outer diameter equal to the inner diameter of a round tubular portion of the light-blocking cover 10. In regions of the restricting plate portion 121 corresponding to the locations of the reflecting parts 4 to 7, there are formed exposing parts 123 which take the form of through holes in which the light-receiving projecting parts 14 are fitted, exposing their end surfaces to the rear side. Also in regions of the restricting plate portion 121 corresponding to the locations of the projections 102 of the light-blocking cover 10, there are formed holes 124 which allow the projections 102 to be passed through and welded as well as spaces 125 which are located around the holes 124 and accommodate molten parts of the projections 102. In this embodiment, the light transmittance of the shielding element 12 is set to 70%.

Also in this embodiment, a light-reflecting layer 126 made of a white hot-stamping layer extending in a radial direction is formed on the front side of the restricting plate portion 121 in its area corresponding to a specified area R1 of the indicating portion 2 which is located within the central region of swing motion R.

Figure 4:
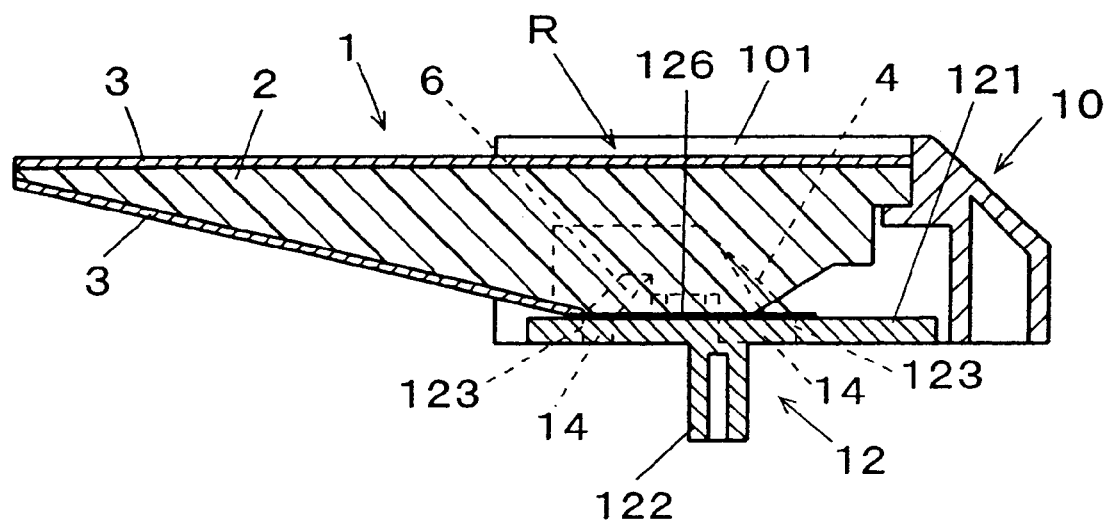

When the light source 41 is lit in an assembled state shown in FIG. 4, its illuminating light is introduced into the central region of swing motion R of the pointer element 1 through the exposing parts 123 (light-receiving projecting parts 14) made in the restricting plate portion 121 of the shielding element 12 and arrives at the individual reflecting parts 4 to 7. The illuminating light which has arrived at the individual reflecting parts 4 to 7 can be roughly divided into illuminating light which is reflected toward the tip end and rear end of the indicating portion 2 (glowing surface) and illuminating light that reaches the specified area R1 (see FIG. 1) of the indicating portion 2 (glowing surface) located within the central region of swing motion R (plus some part of the illuminating light which undergoes repetitive internal reflections within the central region of swing motion R). Conventionally, the amount of illuminating light that arrives in the specified area R1 of the indicating portion 2 which is located within the central region of swing motion R has tended to become smaller than the amount of illuminating light that is reflected toward the tip end and rear end of the indicating portion 2 and, as a consequence, there has been a tendency for the specified area R1 of the indicating portion 2 located within the central region of swing motion R to become dim with the illuminating light introduced into the central region of swing motion R through the exposing parts 123 (light-receiving projecting parts 14) alone.

However, because the shielding element 12 of this invention is formed of a light-transmitting material as described above, the illuminating light is introduced into the central region of swing motion R not only through the exposing parts 123 but also through the shielding element 12 itself. That portion of the illuminating light which is introduced into the central region of swing motion R through the shielding element 12 itself, other than through the exposing parts 123, makes up for the lack of the amount of light in the specified area R1 of the indicating portion 2 located within the central region of swing motion R and, thus, a decrease in brightness in this area can be suppressed. This makes it possible to reduce variations in brightness and unevenness in illumination and cause the glowing surface to glow continuously with amber illuminating light generally uniformly from its tip end to rear end.

A reason why the tinted transparent resin having a matte surface of black or a dark color is used as the light-transmitting material forming the shielding element 12 in this embodiment is that there some objectives in this arrangement. One objective is to prevent the specified area R1 from becoming too bright by adjusting the amount of transmission of the illuminating light which arrives in the specified area R1 of the indicating portion 2 located within the central region of swing motion R through a region having a larger area ratio than the exposing parts 123. Another objective is to suppress internal reflections within the central region of swing motion R as much as possible so that the uniformity of illumination would not be impaired. Still another objective is to reduce the amount of the illuminating light that is reflected to the rear side of the central region of swing motion R through the shielding element 12. In a case where a luminous pointer according to this embodiment is disposed on an unillustrated indicator plate carrying a design including a graduated scale, letters and other markings, for instance, it is possible to suppress halation which can occur when reflected light that has passed through the shielding element 12 falls upon the surface of the indicator plate.

Further, when selecting a material or properties of the shielding element 12, it is not absolutely necessary to use the tinted transparent resin having a matte surface of black or a dark color as employed in this embodiment. Instead, it is possible to use a material of other colors, such as a white-based tinted transparent resin of translucent white or a light-transmitting material (semitransparent material) of various color tones if it is desired to further increase luminous efficiency depending on the material or construction of the pointer element 1 or shielding element 12 or on the characteristics of the light source.

A reason why the light-reflecting layer 126 is provided on the restricting plate portion 121 of the shielding element 12 in this arrangement is that it is intended to raise the brightness of the specified area R1 of the indicating portion 2 by increasing illuminating light reflecting efficiency with the light-reflecting layer 126, since the reflecting parts 4 to 7 are located in the area outside of the glowing surface in the construction of the embodiment. Thus, the light-reflecting layer 126 need not be employed if uniform brightness of illumination of the glowing surface is maintained without employing it.

As thus far described, the pointer element 1 made of a light-transmitting material has in its central region of swing motion R the reflecting parts 4 to 7 for reflecting the illuminating light from the rear side toward the tip end and rear end, and the shielding element 12 disposed to cover the central region of swing motion R of the pointer element 1 from the rear side is formed of a light-transmitting material and has the exposing parts 123 for exposing portions of the central region of swing motion R corresponding to the locations of the reflecting parts 4 to 7 according to this embodiment. In this construction, the illuminating light which has passed with adjusted light transmittance through light-transmitting areas other than the exposing parts 123 of the shielding element 12 is introduced into the central region of swing motion R of the pointer element 1 in addition to the illuminating light that is introduced directly through the exposing parts 123 of the shielding element 12. As the illuminating light which has passed through light-transmitting areas serves to increase the amount of illuminating light delivered to the specified area R1 of the indicating portion 2 located within the central region of swing motion R and suppress the decrease in brightness in this area, it becomes possible to decrease unevenness in the brightness of the glowing surface and thereby increase the commercial value.

While part of the illuminating light is introduced into the specified area R1 of the indicating portion 2 directly through the exposing parts 123 of the shielding element 12 in the same way as the prior art, the illuminating light of which amount of transmittance has been adjusted by passing through the light-transmitting areas other than the exposing parts 123 of the shielding element 12 can be delivered to a portion of the glowing surface located within the central region of swing motion R. Thus, the portion of the glowing surface located within the central region of swing motion can be illuminated with proper balance without becoming too bright or too dim and, as a consequence, the glowing surface can be caused to glow generally uniformly all the way along its length.

Since the shielding element 12 is constructed of the connecting member for connecting the pointer element 1 to the pointer shaft in this embodiment, the glowing surface can be caused to glow generally uniformly all the way along its length without using dedicated components and, therefore, it is possible to achieve a cost reduction.

Furthermore, since the light-reflecting layer 126 is formed in an area of the shielding element 12 corresponding to the glowing surface in this embodiment, it is possible to increase the illuminating light reflecting efficiency of a region corresponding to the specified area R1 of the indicating portion 2 located within the central region of swing motion R. This makes it possible to improve the unevenness in the brightness of the glowing surface by adjusting the uniformity of illumination in a case where the brightness of illumination in the specified area R1 of the indicating portion 2 located within the central region of swing motion R is inadequate.

Furthermore, since the reflecting parts 4 to 7 are constructed of the first reflecting parts 4, 5 which reflect the illuminating light toward the tip end side of the longitudinal direction of the pointer element 1 and the second reflecting parts 7, 8 which reflect the illuminating light toward the rear end side of the longitudinal direction of the pointer element 1 in this embodiment, it is possible to efficiently guide the illuminating light to the pointer element 1 extending in the longitudinal direction so that its area including the central region of swing motion R covered by the light-blocking cover 10 becomes the glowing surface and the efficiency of illumination is thereby increased.

Moreover, there are provided the projecting parts 1a in the central region of swing motion R that project to both sides of the longitudinal axial line of the glowing surface of the pointer element 1 and the reflecting parts (first and second reflecting parts) 4 to 7 are provided at positions outside of the glowing surface on either side of the projecting parts 1a in this embodiment. There exists a tendency for the specified area R1 of the indicating portion 2 to become particularly dark when the reflecting parts 4 to 7 are situated in the area outside of the glowing surface as stated above. Although the luminous pointer is of such a type, the lack of brightness in the specified area R1 is compensated for to achieve the uniformity of illumination with the shielding element is formed of the light-transmitting material as describe above.

Moreover, it is possible to increase the illuminating light reflecting efficiency since the light-reflecting layer 126 is provided in the area of the shielding element 12 corresponding to the glowing surface of the indicating portion 2 in the aforementioned construction. This makes it possible to carry out illumination balance adjustment, which is particularly effective as a means for compensating for the inadequacy of the brightness of illumination within the specified area R1.

Further, depending on the shape of the rear side of the central region of swing motion R of the pointer element 1, there can be a case in which it is difficult to coat the rear side of the indicating portion 2 all the way along its length with a pigmented layer 3 or a reflective white hot-stamping layer. In such a case, the pigmented layer 3 or reflective white hot-stamping layer may be formed on the shielding element 12, and it is expected that an effect equivalent to what is achieved by coating the rear side of the central region of swing motion R with a layer of the same kind is obtained by doing so. This means that the function of this kind of layer which is normally formed on the rear side of the central region of swing motion R can be assigned to the light-reflecting layer 126.

As an alternative way of assigning the function of the light-reflecting layer 126 to other member, the shielding element 12 itself may be formed of a white-based semi-transparent material of translucent white, for example.

Figure 5:
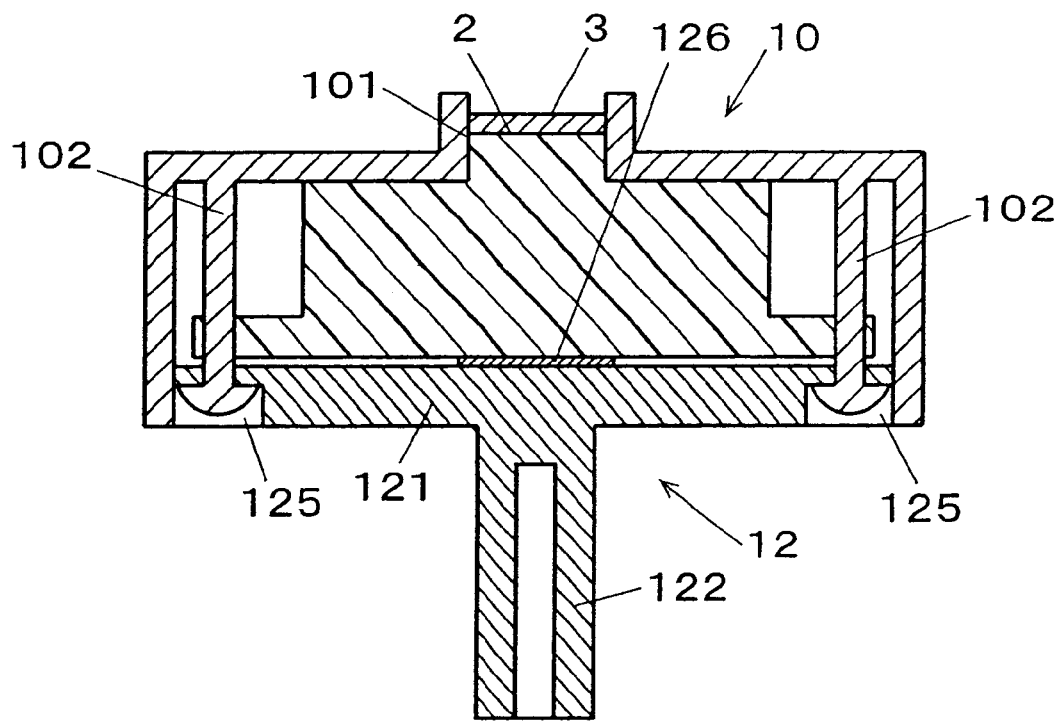
FIG. 5 is a cross-sectional diagram of a luminous pointer showing a second embodiment of the invention.

FIG. 5 shows another embodiment according to the present invention. In this embodiment, the shielding element 12 is formed of a light-transmitting transparent resin material having amber or a color of the same kind as the glowing color of the indicating portion 2.

Here, the glowing surface is formed into a round-shaped surface for reasons stated below. Although it is possible to suppress leakage of the illuminating light from between the indicating portion 2 and the slit 10 in the light-blocking cover 10 by producing a coating of a pigmented layer 3 formed of a hot-stamping layer up to positions where edges of the pigmented layer 3 come almost in contact with the light-blocking cover 10. However, the pigmented layer 3 would not easily adhere especially at its edges and the pigmented layer 3 could come off when it goes into contact with the light-blocking cover 10. For these and other reasons, there are cases in which the function of suppressing the light leakage from between the indicating portion 2 and the slit 101 in the light-blocking cover 10 is not obtained with the pigmented layer 3 alone.

In this embodiment, however, because the shielding element 12 is formed of the light-transmitting transparent resin material having amber or a color of the same kind as the glowing color of the indicating portion 2, even when the illuminating light leaks from between the indicating portion 2 and the slit 101 in the light-blocking cover 10 for the aforementioned reasons, the illuminating light which has leaked from there is tinted by the shielding element 12 into the same color or a color of the same kind as the glowing color of the indicating portion 2. This makes the leakage of the illuminating light less noticeable and serves to increase the commercial value.

While there are provided the reflecting parts 4 to 7 which reflect the illuminating light toward the tip end and rear end sides in the above-described first and second embodiments, it would be sufficient is the reflecting parts 4, 5 for reflecting and delivering the illuminating light at least toward the tip end side are provided. The reflecting parts 6, 7 for reflecting and delivering the illuminating light toward the rear end side may be additionally provided depending on the length of the indicating portion (glowing surface) to be illuminated, for instance.

Furthermore, although there have been constructions in which the reflecting parts 4 to 7 are disposed at positions offset to the sides of the indicating portion (glowing surface) 2 in the above-described first and second embodiments, it is needless to say that the reflecting parts 4 to 7 may be located immediately beneath the indicating portion (glowing surface) 2.

Moreover, although the shielding element 12 is made of a semitransparent synthetic resin of a dark color in the above-described first and second embodiments, it is possible to use a light-adjusting membrane formed by a printing, coating or heat-transfer technique as a means for making the shielding element 12 capable of adjusting transmitted light. Another alternative approach is to form the shielding element 12 itself from a transparent or semitransparent synthetic resin and coat the front side or rear side of the shielding element 12 thus produced with the above-mentioned light-adjusting membrane of a dark or whitish color so that the shielding element 12 becomes capable of adjusting the transmitted light.

INDUSTRIAL APPLICABILITY

The present invention is widely applicable to luminous pointers of instruments used not only in vehicles including motor vehicles but also in vessels and aircraft.

What is claimed is:

1. A luminous pointer comprising a pointer element having a reflecting part for reflecting illuminating light fed from an illuminating light source at a rear side of a central region of swing motion of said pointer element at least toward its tip end, wherein said pointer element is formed of a light-transmitting material and a glowing surface which glows in the form of a line including said central region of swing motion is formed by the illuminating light guided by said reflecting part; and a shielding element disposed between the pointer element and the illuminating light source and fixed to said pointer element covering its central region of swing motion from the rear side, said shielding element having an exposing part for exposing an area of said central region of swing motion corresponding to said reflecting part, and wherein said shielding element is formed to have a light-transmitting property so that it can adjust the amount of transmission of the illuminating light.

2. A luminous pointer as defined in claim 1, wherein said reflecting part includes a first reflecting part for reflecting the illuminating light toward the tip end of said pointer element and a second reflecting part for reflecting the illuminating light toward the rear end of said pointer element.

3. A luminous pointer as defined in claim 1, wherein said central region of swing motion is covered with a light-blocking cover which opens rearward, and a slit for exposing an area of the glowing surface located within said central region of swing motion is formed in said light-blocking cover.

4. A luminous pointer as defined in claim 1, wherein said shielding element is formed of a light-transmitting material of a dark color.

5. A luminous pointer as defined in claim 1, wherein said central region of swing motion has a projecting part protruding to both sides with respect to a longitudinal axial line of the glowing surface and said reflecting parts are formed on both sides of said projecting part at locations outside of the glowing surface.

6. A luminous pointer as defined in claim 1, wherein said shielding element is constructed of part of a joining member for connecting said pointer element to a pointer shaft.

7. A luminous pointer as defined in claim 1, wherein a light-reflecting layer is formed on said shielding element.

8. A luminous pointer as defined in claim 3, wherein a pigmented layer is provided on at least one of front and rear sides of said pointer element and said shielding element is formed of a tinted transparent material of the same color or a color of the same kind as the pigmented layer.

9. A luminous pointer, comprising:
   a pointer element formed of a light-transmitting material and including an indicating portion on a top portion thereof;
   a shielding element formed of a light-attenuating material disposed at a bottom portion of the pointer element between a light source and the pointer element and fixed to the pointer element to cover a predetermined area about an axis of rotation of the pointer element, the shielding element including an exposing part configured to transmit substantially unattenuated illuminating light; and
   a reflector element disposed adjacent the shielding element and adjacent the pointer element, the reflector element configured to receive illuminating light provided through the exposing part and output the illuminating light to at least one light concentration portion of the pointer element to illuminate the indicating portion,
   wherein the pointer element is illuminated by a combination of illuminating light from the reflecting part and attenuated illuminating light through the light-attenuating material of the shielding element.

10. A luminous pointer as defined in claim 9, wherein the reflecting part includes a first reflecting part for reflecting the illuminating light toward a tip end of the pointer element and a second reflecting part for reflecting the illuminating light toward a rear end of the pointer element.

11. A luminous pointer as defined in claim 9, wherein said exposing part comprises a through hole in the shielding element.

12. A luminous pointer as defined in claim 9, wherein said shielding element is a tinted transparent resin.

13. A luminous pointer as defined in claim 12, wherein the light transmittance of the shielding element is approximately 70%.

14. A luminous pointer as defined in claim 10, wherein a light-reflecting layer is disposed between the shielding element and the pointer in the predetermined area about the axis of rotation of the pointer element to reflect incident illuminating light from the pointer element.

15. A luminous pointer as defined in claim 10, wherein the predetermined area about the axis of rotation of the pointer element is covered on a top portion with a light-blocking cover and wherein the cover includes an opening corresponding to an area of the indicating portion of the pointer element.

16. A luminous pointer as defined in claim 12, wherein a pigmented layer is provided on at least one of a top side and a bottom side of the pointer element and the shielding element is formed of a tinted light-attenuating material outputting light having substantially a same color as light output from the pigmented layer.

17. A luminous pointer as defined in claim 1, wherein said reflecting part is disposed in an area outside of an indicating portion and within the central region of swing motion.

18. A luminous pointer as defined in claim 17, wherein said reflecting part is disposed adjacent a left side or a right side of a longitudinal axis of said pointer element.

19. A luminous pointer comprising a pointer element having a reflecting part for reflecting illuminating light fed from an illuminating light source at a rear side of a central region of swing motion of said pointer element at least toward its tip end, wherein said pointer element is formed of a light-transmitting material and a glowing surface which glows in the form of a line including said central region of swing motion is formed by the illuminating light guided by said reflecting part; and a shielding element disposed between the pointer element and the illuminating light source and fixed to said pointer element covering its central region of swing motion from the rear side, said shielding element having an exposing part for exposing an area of said central region of swing motion corresponding to said reflecting part, said exposing part configured to transmit substantially unattenuated illuminating light, and wherein said shielding element is formed of a light-attenuating material and to have a light-transmitting property so that it can adjust the amount of transmission of the illuminating light wherein the pointer element is illuminated by a combination of illuminating light from the exposing part and attenuated light through the light attenuating material of the shielding element.

20. A luminous pointer as defined in claim 19, wherein said central region of swing motion is covered with a light-blocking cover which opens rearward, and a slit for exposing an area of the glowing surface located within said central region of swing motion is formed in said light-blocking cover.

* * * * *